United States Patent
Luebbert et al.

(10) Patent No.: US 12,326,106 B2
(45) Date of Patent: Jun. 10, 2025

(54) CONVEYING DEVICE WITH FILTER ELEMENT

(71) Applicant: Vitesco Technologies GmbH, Regensburg (DE)

(72) Inventors: Tobias Luebbert, Cologne (DE); Peter Bauer, Bonn (DE); Cornelius Köhler, Hürth (DE); Youness Idar, Freyming-Merlebach (FR)

(73) Assignee: Vitesco Technologies GmbH, Regensburg (DE)

( * ) Notice: Subject to any disclaimer, the term of this patent is extended or adjusted under 35 U.S.C. 154(b) by 31 days.

(21) Appl. No.: 18/038,251

(22) PCT Filed: Nov. 19, 2021

(86) PCT No.: PCT/EP2021/082293
§ 371 (c)(1),
(2) Date: May 23, 2023

(87) PCT Pub. No.: WO2022/112126
PCT Pub. Date: Jun. 2, 2022

(65) Prior Publication Data
US 2023/0407779 A1 Dec. 21, 2023

(30) Foreign Application Priority Data
Nov. 26, 2020 (DE) ................... 10 2020 214 869.4

(51) Int. Cl.
*F01N 13/18* (2010.01)
*F01N 3/20* (2006.01)

(52) U.S. Cl.
CPC .......... *F01N 13/1838* (2013.01); *F01N 3/206* (2013.01); *F01N 3/208* (2013.01); *F01N 2610/02* (2013.01); *F01N 2610/1406* (2013.01); *F01N 2610/1426* (2013.01); *F01N 2610/1433* (2013.01); *F01N 2900/1814* (2013.01)

(58) Field of Classification Search
CPC ........ F01N 3/206; F01N 3/2066; F01N 3/208; F01N 13/18; F01N 13/1838; F01N 2340/04; F01N 2610/02; F01N 2610/14; F01N 2610/1406; F01N 2610/1426; F01N 2610/1433; F01N 2610/1493; F01N 2900/1814; F01N 2900/1822
See application file for complete search history.

(56) References Cited

U.S. PATENT DOCUMENTS

| | | | |
|---|---|---|---|
| 5,547,568 A | 8/1996 | Sasaki | |
| 2002/0023418 A1 | 2/2002 | Kojima | |
| 2004/0060286 A1* | 4/2004 | Huber | B01D 53/9431 60/285 |
| 2010/0212290 A1* | 8/2010 | Thiagarajan | F01N 3/2066 60/274 |
| 2012/0160934 A1* | 6/2012 | Ponnathpur | F01N 3/2066 239/289 |
| 2013/0074590 A1* | 3/2013 | Bertow | G01M 15/10 73/114.71 |
| 2013/0340409 A1* | 12/2013 | Hodgson | F01N 3/08 60/285 |
| 2015/0204225 A1* | 7/2015 | Wu | B01D 53/92 137/1 |
| 2017/0082002 A1* | 3/2017 | Ge | F01N 3/30 |
| 2019/0277175 A1* | 9/2019 | Lorenz | F01N 3/208 |
| 2020/0256232 A1* | 8/2020 | Fujii | F01N 13/1844 |

FOREIGN PATENT DOCUMENTS

| | | |
|---|---|---|
| CN | 110925060 | 3/2020 |
| DE | 102009047046 | 5/2011 |
| DE | 102010033682 | 2/2012 |
| DE | 102011003585 | 8/2012 |
| DE | 102016010524 | 3/2018 |
| EP | 2299079 | 3/2011 |
| EP | 3653423 | 5/2020 |

OTHER PUBLICATIONS

Office Action of corresponding German Patent Application No. 10 2020 214 869.4.

* cited by examiner

*Primary Examiner* — Binh Q Tran
(74) *Attorney, Agent, or Firm* — COZEN O'CONNOR

(57) ABSTRACT

A conveying device for an aqueous urea solution in a motor vehicle, with a tank, with a filter element and with a pump. The aqueous urea solution can be conveyed by the pump from the tank through the filter element into a suction line, wherein the filter element has a filter material and a frame for receiving the filter material, wherein the filter material is connected to the frame by a connection element, wherein the connection element is part of the fluid conveying path from the tank via the filter element to the pump.

11 Claims, No Drawings

CONVEYING DEVICE WITH FILTER ELEMENT

CROSS REFERENCE TO RELATED APPLICATIONS

This is a U.S. national stage of Application No. PCT/EP2021/082293 filed Nov. 19, 2021. Priority is claimed on German Application No. DE 10 2020 214 869.4 filed Nov. 26, 2020 the content of which is incorporated herein by reference.

BACKGROUND OF THE INVENTION

1. Field of the Invention

The disclosure relates to a conveying device for an aqueous urea solution in a motor vehicle, with a tank, with a filter element, and with a pump, wherein the aqueous urea solution can be conveyed by the pump from the tank through the filter element into a suction line, wherein the filter element has a filter material and a frame for receiving the filter material.

2. Description of the Related Art

In many countries all around the world, legal regulations have been made that define an upper limiting value for the content of specific substances in the exhaust gas from internal combustion engines. These are mostly substances of which the discharge into the environment is undesirable. One of these substances is represented by nitrogen oxide (NOx), of which the proportion in the exhaust gas must not exceed legally defined limiting values. Because of the boundary conditions, for example the design of the internal combustion engine with a view to beneficial consumption and the like, the internal engine avoidance of the nitrous oxide emissions when reducing the proportion of the nitrogen oxides in the exhaust gas is possible only to a limited extent, so that exhaust gas post-treatment is necessary to comply with relatively low limiting values. Here, it has transpired that selective catalytic reduction (SCR) of the nitrous oxides is advantageous. These SCR methods need a reducing agent which contains nitrogen. In particular, the use of ammonia (NH3) as a reducing agent has emerged as a possible alternative. Because of the chemical properties and the legal provisions in many countries, the ammonia is usually not kept as pure ammonia, since this can lead to problems in particular in motor vehicles or other mobile applications. Rather, instead of storing the reducing agent itself, reducing-agent precursors are often stored and carried along A reducing-agent precursor is to be understood to mean a substance which splits off the reducing agent or which can be converted chemically into the reducing agent. For example, urea represents a reducing-agent precursor for the reducing agent ammonia.

The aqueous ammonia solution, the urea, is carried along in a tank and conveyed into the exhaust gas tract in accurately metered quantities by a suitable conveying device. The conveying device for this purpose routinely has, amongst other things, a pump for conveying the fluid, one or more filters for purifying the fluid, optionally heating devices for thawing the fluid, and a control device for processing internal and external data and for actuating the pump, the heating devices and further controllable components, such as the injector for example.

A disadvantage of the prior art devices is, in particular, that so far there are no devices that ensure that, when replacing a filter, a product of sufficient quality and technical functionality is used, thus ensuring the functionality of the device as whole.

DESCRIPTION OF THE INVENTION

It is therefore an object of one aspect of the present disclosure to create a conveying device which prevents or at least hinders the exchange of a filter for an unsuitable replacement medium.

An exemplary aspects relates to a conveying device for an aqueous urea solution in a motor vehicle, with a tank, with a filter element and with a pump, wherein the aqueous urea solution can be conveyed by the pump from the tank through the filter element into a suction line, wherein the filter element has a filter material and a frame for receiving the filter material, wherein the filter material is connected to the frame by a connection element, wherein the connection element is part of the fluid conveying path from the tank via the filter element to the pump.

The aqueous urea solution, which is referred to hereinafter as fluid, is conveyed via the pump from the tank to a consumer, such as an injector on the exhaust gas line, for example. The fluid is conveyed here from the tank through the filter material into a suction line, from where it is then conveyed on to the consumer. Special valves for controlling the fluid flow and devices for degassing, in particular for discharging air located in the lines, can be provided along the lines.

The filter material can be formed for example by a mesh-like material, a porous material or an element, which has a plurality of openings that allow the fluid to flow through, but prevent the passage of solids from a certain size. Filter materials of this type are known in a wide variety of variants in the prior art.

The filter material is characterized in particular in that it is formed in such a way that the fluid from the tank can flow only via a defined cross section out from the tank into the suction line. The filter material can be formed in a multi-layered manner, for example, as a pocket so that a region for fluid that has already been filtered is created within the volume spanned by the pocket. The filtered fluid from this region can flow over into the suction line towards the pump only along the defined cross section, which for example is formed by a defined opening in the pocket.

In the space spanned by the filter material, a support body can preferably be provided, which assists the forming of the space and in particular prevents the filter material from caving in.

The suction line describes in particular the portion of the fluid conveying line that is arranged downstream of the filter in the usual flow direction (from the tank to the pump) and upstream of the pump. The line is located on the suction side of the pump. The suction line can extend, in particular, also along individual housing portions of the conveying device. In particular, a part of the housing that also forms the frame for the filter material or receives same can also be formed as part of the suction line.

The frame serves in particular to fix and/or shape the filter material. Depending on the used filter material, it may be that an additional support structure, the frame, is required in order to stretch out the filter material and thus produce sufficient filter area. The frame can have fixing points to which the filter material can be connected.

Alternatively, the frame can also have a plurality of bars and ribs, which form a framework which spans a space within which the filter material is preferably arranged.

As already mentioned, the frame can be in particular part of the fluid conveying path, which is arranged upstream of the pump, so that the frame for example has an attachment point, where the filter material is attached to the frame so that the filtered fluid can flow from the volume spanned by the filter material, through this attachment point, into the suction line.

In the simplest case, the frame is part of the housing of the device and is formed merely by a connection point or the attachment point for the filter material and additionally forms, as appropriate, a support face where the filter material can be supported at least in part, in particular on one side.

For connection of the filter material to the frame, the connection element is provided, which serves to produce a fluid-tight and durable connection between the filter material and the frame. The filter material and/or the attachment point on the frame can have connection pieces for this purpose, which can be connected to the connection element in a simple way. To this end, grooves, protrusions, threads or other profiles can be provided in particular.

The connection element can be an additional component, which is connected to the frame and the filter material, or can be fixedly installed on one side. In an advantageous embodiment the connection element is fixedly connected to the filter material such that only an additional connection has to be produced between the connection element and the frame. The connection element with the attached filter material can thus, for example, be pressed into a receiving region on the frame or screwed in or connected in some other way.

Alternatively, the connection element can also be fixedly connected to the frame so that the filter material is pressed in or screwed into the connection element. The connection principle, however, remains the same here.

It is particularly advantageous if the connection element fixes the filter material locally relative to the frame. As already mentioned, the frame is preferably part of the housing of the device.

In a preferred embodiment the device is constructed in such a way that it has a pot-shaped housing which is inserted through an opening in a tank wall, preferably the wall forming the base, into a tank and is connected to this wall via a peripheral flange.

The pump and any other elements, such as the control device for example, are preferably arranged on the side of the pot-shaped housing facing away from the tank and are thus not in direct contact with the fluid.

It is also advantageous if the frame has a fluid line which is in fluidic contact with the pump, wherein the fluid line has, on the frame, an inlet opening to which the filter material is connected by the connection element. The inlet opening is locally arranged directly adjacently to the connection point of the filter material on the frame.

In a particularly preferred embodiment, the inlet opening is part of the connection point, so that it is ensured that the fluid can flow from the space spanned by the filter material only directly into this inlet opening and thus into the downstream fluid line. The fluid line can be formed for example by a short portion, such as the bore in a wall of the housing, or also by a longer channel portion running in a wall, or a pipeline. Depending on the design, the fluid line can be identical to the suction line which is fluidically upstream of the pump and downstream of the filter.

A preferred exemplary aspect is characterized in that the connection element produces a fluid-tight connection between the filter material and the fluid line. The connection element is thus a sealing element that seals the connection between the filter material and the connection point on the frame. In accordance with aspects of the invention the device is designed deliberately in such a way that a missing connection element or a damaged filter element leads to a leak, whereby the function of the device is no longer ensured.

In particular, the opening of the connection between the filter material and the frame leads to a destruction of the connection element, so that the functionality is no longer ensured and the connection is physically unstable and/or fluidically untight.

It is also preferred if the connection element produces a connection between the frame and the filter material that cannot be released non-destructively. A connection that cannot be released non-destructively is distinguished in particular in that the connection between the elements to be connected can be produced only once during regular assembly. A subsequent opening of the connection leads to a destruction or at least substantial damage of the connection element.

In addition, it is advantageous if the connection that cannot be released non-destructively is produced by a bayonet closure. This is advantageous in order to produce the connection for example by the rotation of the two components to be connected relative to one another, or in a particularly preferred embodiment to rotate merely the connection element relative to the filter material and/or the frame. A bayonet closure in particular does not require a high angle of twist of the involved parts relative to one another, and therefore a durable connection can be produced also in confined spaces.

It is furthermore advantageous if the connection that cannot be released non-destructively is formed by pawls that break under a sufficiently high application of force against the direction of closure. Pawls are formed for example by shaped bodies which protrude radially inwardly from the inner periphery of an opening and which are arranged at an angle in the peripheral direction. This can be formed preferably on the connection element formed as a ring. For example, a profiling is provided on the outer periphery of the counterpiece, on which the connection element is mounted, and is formed in such a way that the pawls slide over this profiling in a rotation direction, wherein, however, a blocking occurs if the pawls are guided over the profiling in the opposite direction.

This principle is implemented for example in a freewheel of a bicycle hub, as is known. The profiling on the outer periphery and the pawls can be designed in a wide variety of variants. The core concept is that the two elements, in particular the connection element and the filter material and/or the frame, are rotatable relative to one another in a rotation direction and in each case are blocked relative to one another in the opposite direction.

Should a force be applied to the connection that is so great that it is sufficient to break the pawls, the connection releases and a fixed and fluid-tight connection can no longer be produced.

It is also expedient if the closure direction of the connection that cannot be released non-destructively is rotary or translatory. Depending on how the connection element is to be attached to the filter material and/or the frame, it may be advantageous if the connection is produced via a translatory movement or a rotary rotation. A bayonet connection is preferably produced by a rotation, whilst for example a plug connection is produced by a linear translatory movement.

The principle of the pawls can also be used in the case of a plug connection, which is produced by a translatory movement. Here, pawl elements protruding for example from the inner periphery can be fixed by pressing via a bead or into a groove, whereby a fixed fluid-tight connection is produced by a form fit. The application of a force against the plug direction leads lastly to a destruction of the pawl elements by shearing.

In addition, it is advantageous if the connection that cannot be released non-destructively is produced during the connection of the filter element to the frame by the connection element and is destroyed when the filter material is released from the frame. This is advantageous in particular since, in accordance with an aspect of the invention, the connection is to be produced one time during the assembly, and a disassembly and renewed assembly is to be avoided.

It is furthermore expedient if the connection element is formed as a ring, wherein the connection of the connection element to the filter material and/or to the frame is designed so as not to be releasable non-destructively.

The connection element is preferably a ring, wherein the connection points on the frame and/or on the filter material preferably have a corresponding cross section so that the ring can be attached thereto. The connection element as a ring can be arranged on the filter element or the frame in a preferred embodiment and can be connected thereto permanently or releasably, for example by screwing. The connection to the other element in each case is then produced by the connection that cannot be released non-destructively. In this way, on the one hand a possibility for simple assembly can be ensured, and on the other hand it can be ensured that a connection that cannot be released non-destructively is produced at least to one of the elements, so that a renewed assembly following the first release is not possible.

In a preferred embodiment the connection element can have a screw thread on one side, by which the connection element is screwed to the frame, for example. The filter element is in this case attached to the connection element by a connection that cannot be released non-destructively for example by a bayonet connection. To this end, the annular connection element can have, for example, two portions rotatable relative to one another, which, once the filter material has been inserted, are rotated relative to one another and in so doing fix the filter material by a connection already described previously. This allows assembly in a spatially delimited working environment and furthermore allows the connection element to be easily replaced following destruction of the connection to the filter material.

In such an embodiment the connection element is preferably formed in such a way that a release of the screwed connection to the frame also leads automatically to a destruction of the connection to the filter material. This can be produced in that the two portions of the ring rotatable relative to one another are designed such that the tightening of the ring to the attachment point of the frame is possible, whereas a release of the ring from the attachment leads to destruction of the pawls. This can be achieved for example in that the two portions rotatable relative to one another are rotated relative to one another during the release process in such a way that the pawls are destroyed and thus the secure and fluid-tight connection is no longer ensured.

Depending on an aspect of the invention, the screwed connection can also be produced with the filter material, and the connection that cannot be released non-destructively can be produced with the frame.

The exemplary aspects described here are exemplary and serve to explain the concept of aspects of the invention. The exemplary embodiments have no limiting effect.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A conveying device for an aqueous urea solution in a motor vehicle, comprising:
   a tank;
   a filter element;
   a suction line; and
   a pump, wherein the aqueous urea solution is conveyed by the pump from the tank through the filter element into the suction line,
   wherein the filter element has a filter material and a frame for receiving the filter material, the filter material is connected to the frame by a connection element, wherein the connection element is part of a fluid conveying path from the tank via the filter element to the pump.

2. The conveying device as claimed in claim 1, wherein the connection element fixes the filter material locally relative to the frame.

3. The conveying device as claimed in claim 1, wherein the frame has a fluid line which is in fluidic contact with the pump, wherein the fluid line has, on the frame, an inlet opening to which the filter material is connected by the connection element.

4. The conveying device as claimed in claim 3, wherein the connection element produces a fluid-tight connection between the filter material and the fluid line.

5. The conveying device as claimed in claim 1, wherein the connection element produces a connection that cannot be released non-destructively between the frame and the filter material.

6. The conveying device as claimed in claim 5, wherein the connection that cannot be released non-destructively is a bayonet closure.

7. The conveying device as claimed in claim 5, wherein the connection that cannot be released non-destructively is formed by pawls that break under a sufficiently high application of force against a direction of closure.

8. The conveying device as claimed in claim 5, wherein the direction of closure of the connection that cannot be released non-destructively is rotary or translatory.

9. The conveying device as claimed in claim 5, wherein the connection that cannot be released non-destructively is produced during the connection of the filter element to the frame by the connection element and is destroyed when the filter material is released from the frame.

10. The conveying device as claimed in claim 5, wherein the connection element is formed as a ring, wherein the connection of the connection element to the filter material and/or to the frame is designed so as not to be releasable non-destructively.

11. The conveying device as claimed in claim 6, wherein the connection that cannot be released non-destructively is formed by pawls that break under a sufficiently high application of force against a direction of closure.

* * * * *